(12) United States Patent
Kim

(10) Patent No.: US 12,401,861 B2
(45) Date of Patent: Aug. 26, 2025

(54) MOBILE ARTIFICIAL NEURAL NETWORK APPARATUS

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 17/311,693

(22) PCT Filed: Dec. 7, 2020

(86) PCT No.: PCT/KR2020/017775
§ 371 (c)(1),
(2) Date: Jun. 8, 2021

(87) PCT Pub. No.: WO2021/261686
PCT Pub. Date: Dec. 30, 2021

(65) Prior Publication Data
US 2023/0232080 A1 Jul. 20, 2023

(30) Foreign Application Priority Data

Jun. 25, 2020 (KR) .................. 10-2020-0077480

(51) Int. Cl.
*G06K 9/00* (2022.01)
*G06F 1/3206* (2019.01)
(Continued)

(52) U.S. Cl.
CPC ....... *H04N 21/6581* (2013.01); *G06F 1/3206* (2013.01); *G06F 1/3212* (2013.01);
(Continued)

(58) Field of Classification Search
CPC ............ G06K 19/06; G06K 19/06018; G06K 19/06028; G06K 19/06037; G06N 3/02;
(Continued)

(56) References Cited

U.S. PATENT DOCUMENTS 10,282,776 B2 * 5/2019 Jo ........................... G06V 20/62
10,664,722 B1 * 5/2020 Sharma .................. G06V 10/82
(Continued)

FOREIGN PATENT DOCUMENTS

CN 104715023 A 6/2015
CN 105320931 A 2/2016
(Continued)

OTHER PUBLICATIONS

Chinese Office Action dated Feb. 8, 2025 issued on Application No. 202080008497.5.

*Primary Examiner* — Eric Rush
(74) *Attorney, Agent, or Firm* — invenstone patent LLC

(57) ABSTRACT

A mobile artificial neural network device is provided. The mobile artificial neural network device includes a camera configured to output a video of a product at a first frame rate, an AI recognition model configured to recognize a product information by receiving the product video, an artificial neural network processor configured to drive the AI recognition model at a second frame rate, and a display module configured to display the video of the product at the first frame rate and display the product information at the second frame rate.

15 Claims, 8 Drawing Sheets

(51) Int. Cl.
| | |
|---|---|
| *G06F 1/3212* | (2019.01) |
| *G06F 1/324* | (2019.01) |
| *G06N 3/02* | (2006.01) |
| *G06N 3/045* | (2023.01) |
| *G06N 20/00* | (2019.01) |
| *G06Q 30/0601* | (2023.01) |
| *G06T 19/00* | (2011.01) |
| *G06V 10/10* | (2022.01) |
| *G06V 10/70* | (2022.01) |
| *G06V 10/764* | (2022.01) |
| *G06V 10/82* | (2022.01) |
| *H04N 21/2343* | (2011.01) |
| *H04N 21/466* | (2011.01) |
| *H04N 21/4722* | (2011.01) |
| *H04N 21/658* | (2011.01) |
| *H04N 23/65* | (2023.01) |

(52) U.S. Cl.
CPC ............... *G06F 1/324* (2013.01); *G06N 3/02* (2013.01); *G06N 3/045* (2023.01); *G06N 20/00* (2019.01); *G06Q 30/0623* (2013.01); *G06T 19/006* (2013.01); *G06V 10/17* (2022.01); *G06V 10/70* (2022.01); *G06V 10/764* (2022.01); *G06V 10/82* (2022.01); *H04N 21/234381* (2013.01); *H04N 21/4666* (2013.01); *H04N 21/4722* (2013.01); *H04N 23/651* (2023.01); *G06T 2207/20084* (2013.01)

(58) Field of Classification Search
CPC ............ G06N 3/04; G06N 3/045; G06N 3/06; G06N 3/063; G06N 3/08; G06N 3/082; G06N 3/084; G06N 3/091; G06N 3/098; G06N 20/00; G06Q 30/06; G06Q 30/0623; G06Q 30/0625; G06Q 30/0627; G06Q 30/0629; G06Q 30/0631; G06Q 30/0641; G06Q 30/0643; G06T 1/00; G06T 1/0007; G06T 1/20; G06T 19/006; G06T 2207/20084; H04N 21/20; H04N 21/21; H04N 21/23; H04N 21/234; H04N 21/23418; H04N 21/234381; H04N 21/235; H04N 21/237; H04N 21/238; H04N 21/23805; H04N 21/24; H04N 21/41; H04N 21/4112; H04N 21/4126; H04N 21/414; H04N 21/41407; H04N 21/4143; H04N 21/442; H04N 21/46; H04N 21/4621; H04N 21/4622; H04N 21/466; H04N 21/4662; H04N 21/4666; H04N 21/472; H04N 21/4722; H04N 21/478; H04N 21/47815; H04N 21/4782; H04N 21/60; H04N 21/65; H04N 21/654; H04N 21/658; H04N 21/6581; H04N 23/60; H04N 23/61; H04N 23/617; H04N 23/64; H04N 23/65; H04N 23/651; H04N 23/66; H04N 23/662; H04N 23/667; H04N 23/80; G06F 1/32; G06F 1/3203; G06F 1/3206; G06F 1/3209; G06F 1/3212; G06F 1/3215; G06F 1/3234; G06F 1/324; G06F 1/3243; G06F 1/325; G06F 1/3265; G06F 18/20; G06F 18/21; G06V 10/12; G06V 10/17; G06V 10/19; G06V 10/70; G06V 10/74; G06V 10/764; G06V 10/82; G06V 10/94; G06V 10/95; G06V 10/955; G06V 10/96

USPC ........ 382/100, 103, 115–118, 124, 141–143, 382/154–156, 181–183, 209, 217, 218, 382/224, 226, 227, 229, 254, 291, 382/302–307, 312, 313, 325; 713/300, 713/310, 320–324, 340; 706/1, 2, 4, 10, 706/14, 41; 709/201, 203, 226, 229

See application file for complete search history.

(56) References Cited

U.S. PATENT DOCUMENTS

| | | | | |
|---|---|---|---|---|
| 10,747,292 | B2* | 8/2020 | Liu | G06N 3/045 |
| 11,210,731 | B1* | 12/2021 | Croak | G06Q 20/202 |
| 11,501,500 | B2* | 11/2022 | Choi | G06V 10/82 |
| 2009/0113475 | A1 | 4/2009 | Li | |
| 2015/0302517 | A1* | 10/2015 | Spivack | G06V 20/20 |
| | | | | 705/26.9 |
| 2016/0209648 | A1* | 7/2016 | Haddick | G06Q 30/02 |
| 2018/0091844 | A1* | 3/2018 | Aravamudan | H04N 21/4722 |
| 2018/0144436 | A1* | 5/2018 | Apodaca | G06F 1/3212 |
| 2019/0340524 | A1* | 11/2019 | Kirchhoff | G06N 3/08 |
| 2020/0175401 | A1* | 6/2020 | Shen | G06N 3/045 |
| 2020/0226380 | A1* | 7/2020 | Barras | G06V 20/20 |
| 2020/0272856 | A1* | 8/2020 | Garner | G06V 10/776 |
| 2021/0117948 | A1* | 4/2021 | Voss | G06F 18/241 |
| 2022/0351019 | A1* | 11/2022 | Chen | G06N 3/086 |

FOREIGN PATENT DOCUMENTS

| | | | | | |
|---|---|---|---|---|---|
| CN | 106202317 | A | | 12/2016 | |
| CN | 106462874 | A | | 2/2017 | |
| CN | 108282702 | A | | 7/2018 | |
| CN | 110245559 | A | | 9/2019 | |
| JP | 2018207220 | A | * | 12/2018 | |
| KR | 10-1852598 | B1 | | 4/2018 | |
| KR | 10-2019-0013390 | A | | 2/2019 | |
| KR | 10-2020-0046184 | A | | 5/2020 | |
| KR | 2020046184 | A | * | 5/2020 | ........... G06T 7/0002 |
| KR | 10-2124568 | B1 | | 6/2020 | |

* cited by examiner

| Quantization Level | Accuracy |
|---|---|
| 32 bit Floating Point (Original) | 69.758% |
| 4 bit Integer (Weight/Activation Map) | 69.674% |

<An example of quantization : Resnet-18 Original Model Size : 44.6MB>

FIG. 7A

| Operation | Energy(pj) |
|---|---|
| 8b Add | 0.03 |
| 16b Add | 0.05 |
| 32b Add | 0.1 |
| 16b FP Add | 0.4 |
| 32b FP Add | 0.9 |
| 4b Mult | 0.1 |
| 8b Mult | 0.2 |
| 32b Mult | 3.1 |
| 16b FP Mult | 1.1 |
| 32b FP Mult | 3.7 |
| 32b SRAM Read | 5 |
| 32b DRAM Read | 640 |

<ENERGY CONSUMPTION PER UNIT OPERATION IN HARDWARE PROCESSOR>

FIG. 7B

MOBILE ARTIFICIAL NEURAL NETWORK APPARATUS

CROSS-REFERENCE TO RELATED APPLICATIONS

This application is a national stage of International Application No. PCT/KR2020/017775, filed on Dec. 7, 2020, which claims the benefit of priority to Korean Application No. 10-2020-0077480, filed on Jun. 25, 2020 in the Korean Intellectual Property Office.

BACKGROUND OF THE DISCLOSURE

Technical Field

The present disclosure relates to a mobile artificial neural network device, and more particularly, to a mobile artificial neural network device capable of providing product information recognized using an AI recognition model to a user.

Background Art

Generally, in the operation of a conventional online product purchase system, first, a consumer accesses an online shopping mall server through the Internet using a browser installed in a terminal in order to purchase a product. Then, the shopping mall server transmits webpage information containing information on various products to the corresponding terminal through the Internet, and the terminal displays the corresponding information on a display module. At this time, while a user of the terminal searches the webpage of the shopping mall server displayed on the display module, various text information or photo information on products provided by the shopping mall server is checked. If there is a desired product, the user can select the product and purchase it. The shopping mall server receives payment through an electronic payment method and delivers the paid product offline.

However, in the conventional online product purchase system, it is cumbersome and inconvenient to purchase a product that a consumer wants, because in order to purchase a product that a consumer wants, it is necessary to find the product that the consumer wants through a product search performed after accessing the Internet online and to grasp information about the product. In addition, when there is a desired product offline, there is a problem that it is relatively cumbersome to search for a product's price and information than when online.

SUMMARY OF THE DISCLOSURE

The inventor of the present disclosure has conducted research and development on a mobile terminal capable of quickly recognizing information on a sale product during offline shopping using an artificial neural network.

First, the inventor of the present disclosure attempted to implement augmented reality in a mobile terminal by transmitting the video captured by the mobile terminal to the AI recognition model stored in the Internet server in real time and transmitting the product information recognized by the AI recognition model of the Internet server back to the mobile terminal.

However, in this method, since high-definition video must be transmitted to the Internet server in real time, the amount of data transmission is significantly larger than that of photo information, and the AI recognition model stored in the Internet server must sequentially process many and unspecified recognition requests. In relation to this, the inventor has recognized that it is difficult in practice for users to monopolize the AI recognition model of the server in real time and that the response speed can be significantly delayed depending on the number of users connected to the server.

Accordingly, the inventor of the present disclosure has recognized that it is necessary to perform artificial neural network operations in a mobile terminal.

Accordingly, the problem to be solved by the present disclosure is to provide a mobile artificial neural network device, equipped with a camera in a mobile artificial neural network device, which is a mobile terminal capable of artificial neural network operation, which recognizes product information in real time using an AI recognition model while filming a product in real time with a camera, and which is implemented with augmented reality capable of displaying recognized product information and product video on a display module at the same time in real time.

On the other hand, the inventor of the present disclosure also recognized that the recognition rate (%) of the product may decrease when recognizing a new product with the AI recognition model that has been learned and stored in the mobile artificial neural network device. That is, an AI recognition model that has not learned a new product may recognize it as a similar product that has already been learned, but may not recognize the new product. Accordingly, the inventor of the present disclosure also recognized that the AI recognition model needs to be newly trained in order to improve the recognition rate (%) of each product when a new product is released. Accordingly, the inventor of the present disclosure performed research on a mobile artificial neural network device capable of updating an AI recognition model in order to improve the recognition rate (%) of newly released products. However, the inventor of the present disclosure also recognized that, for the recognition of newly released products, it is not easy for the AI recognition model stored in the mobile artificial neural network device to learn by itself. More specifically, it was recognized that it may take hours or days to learn the AI recognition model, that it is difficult for users to directly generate new learning data for learning of newly released products, and that considerable power consumption and computational amount are required for learning.

Accordingly, another problem to be solved by the present disclosure is to provide a mobile artificial neural network device capable of improving the recognition rate (%) of newly launched products, by updating the AI recognition model stored in the mobile artificial neural network device to the newly trained AI recognition model and minimizing the self-learning of the mobile artificial neural network device.

Meanwhile, the inventor of the present disclosure recognized that the number of products that the AI recognition model can recognize can be determined by the product image of the training set for learning the AI recognition model and the information label of the product. It was further recognized that the big data operators that manufacture or sell products have the advantage of creating a training set of products related to their business area.

Accordingly, another problem to be solved by the present disclosure is to provide a mobile artificial neural network device capable of recognizing various products by storing a plurality of different AI recognition models learned to recognize different products.

Furthermore, the inventor of the present disclosure has also recognized that the recognition rate (%) of the product in the AI recognition model of the mobile artificial neural network device can be improved when the AI recognition model of the mobile artificial neural network device is learned to recognize the unique information of the product, for example, the shape, color, trademark, name, manufacturer, and barcode of the product.

Accordingly, another problem to be solved by the present disclosure is to provide a mobile artificial neural network device capable of improving the recognition rate (%) of a product by providing an AI recognition model that has been learned to recognize unique information of a product.

The inventor of the present disclosure has recognized that specific information among the unique information of a product can be updated in real time. For example, the sales price of a product, information on online and offline vendors, and inventory information of a product may be changed in real time. In other words, it was recognized that it is inefficient to learn additional information of a product that changes in real time with an AI recognition model.

That is, since the above-described additional information on the product is very important to the user when purchasing the product, it was recognized that the additional information on the product is required.

In addition, it was recognized that it is efficient to classify specific product information as additional product information and obtain it separately through a server.

Accordingly, another problem to be solved by the present disclosure is to provide a mobile artificial neural network device capable of receiving additional product information that can be updated in real time by transmitting the product information recognized in the AI recognition model to the server. In addition, another task is to provide a mobile artificial neural network device that can assist in a reasonable online or offline purchase by using the product information recognized by the AI recognition model and additional information of the product searched from the server.

On the other hand, the inventor of the present disclosure recognized the need for an AI recognition model capable of minimizing the reduction in product recognition rate (%) while reducing the computational amount or power consumption of the artificial neural network processor that calculates the AI recognition model to improve performance such as reducing heat generation of the mobile artificial neural network device and improving battery operation time.

Accordingly, another problem to be solved by the present disclosure is to provide a mobile artificial neural network device including an AI recognition model capable of minimizing a decrease in the recognition rate (%) of a product while reducing the computational amount or power consumption of the artificial neural network processor.

Accordingly, another problem to be solved by the present disclosure is to provide a mobile artificial neural network device including a processor capable of efficiently calculating a quantized AI recognition model and a quantized AI recognition model for stable augmented reality implementation of a mobile artificial neural network device.

The problems of the present disclosure are not limited to the problems mentioned above, and other problems that are not mentioned will be clearly understood by those skilled in the art from the following description.

In order to solve the above-described problems, a mobile artificial neural network device according to an embodiment of the present disclosure is provided. The mobile artificial neural network device may include a camera configured to output a video of a product at a first frame rate; an artificial intelligence (AI) recognition model configured to recognize product information by receiving the video of the product; an artificial neural network processor configured to drive an AI recognition model at a second frame rate; and a display module configured to display a video of a product at a first frame rate and to display product information at a second frame rate.

According to another feature of the present disclosure, the first frame rate and the second frame rate may be the same.

According to another feature of the present disclosure, the first frame rate may be faster than the second frame rate.

According to another feature of the present disclosure, the mobile artificial neural network device may further comprise a battery, and the camera or artificial neural network processor may be configured to lower the first frame rate when a remaining charge of the battery falls below the first threshold value.

According to another feature of the present disclosure, the first frame rate may be configured to be selectively adjusted in consideration of power consumption of the mobile artificial neural network device.

According to another feature of the present disclosure, the artificial neural network processor may be configured to include an operation structure capable of performing an artificial neural network operation of the AI recognition model.

According to another feature of the present disclosure, product information may be superimposed on the video of the product to display augmented reality in the display module.

According to another feature of the present disclosure, mobile artificial neural network device may further comprise a communication module, and the communication module may be configured to transmit information on the product to the server and to receive additional information on the product searched from the server.

According to another feature of the present disclosure, the mobile artificial neural network device may be configured to transmit only product information among the product video and the product information to the server through the communication module.

According to another feature of the present disclosure, the mobile artificial neural network device may be configured to transmit product information to the server and to receive additional product information from the server.

According to another feature of the present disclosure, the AI recognition model may be configured to recognize consecutive images of a video of a product input from various angles, and when information of different products among product information is recognized, the information of different products may be combined.

According to another feature of the present disclosure, the accumulated information is at least one of a shape, a color, a trademark, a name, a manufacturer, and a barcode of the product.

According to another feature of the present disclosure, the AI recognition model is configured to recognize the video of the product and to output information of at least one product in the order of a high recognition rate.

According to another feature of the present disclosure, the AI recognition model is configured to be updated with the newly trained AI recognition model through the server.

According to another feature of the present disclosure, the AI recognition model is configured to further include a plurality of mutually different AI recognition models.

According to another feature of the present disclosure, the AI recognition model is configured to recognize the GS1 standard product identification code or barcode and to receive additional information of the product corresponding to the GS1 standard product identification code or barcode through the server.

According to another feature of the present disclosure, the additional information on the product includes information on the lowest price corresponding to the information on the product.

According to another feature of the present disclosure, the AI recognition model is characterized in that it is a lightened AI recognition model.

According to another feature of the present disclosure, the lightened AI recognition model is characterized in that at least one lightening techniques among pruning, quantization, model compression, knowledge distillation, and retraining, and AI-based lightening model optimization techniques is applied.

According to another feature of the present disclosure, the processor is an artificial neural network processor, which is an NPU.

According to a mobile artificial neural network device according to various embodiments of the present disclosure, there is an effect of providing a mobile artificial neural network device implementing augmented reality with a camera equipped in a mobile artificial neural network device, which is a mobile terminal capable of artificial neural network operation, while shooting a product in real time with a camera. The AI recognition model is used to recognize product information in real time, and a display module displays the recognized product information and the product video at the same time.

According to a mobile artificial neural network device according to various embodiments of the present disclosure, since the artificial neural network processor drives the AI recognition model stored in the mobile artificial neural network device, the AI recognition model stored in the Internet server may not be used, and thus, there is an effect of performing product recognition in real time.

According to a mobile artificial neural network device according to various embodiments of the present disclosure, there is an effect of improving the recognition rate (%) of newly launched products by updating the AI recognition model stored in the mobile artificial neural network device with the AI recognition model newly trained from the outside, and there is an effect of removing or minimizing self-learning of the AI recognition model stored in the mobile artificial neural network device.

According to a mobile artificial neural network device according to various embodiments of the present disclosure, it is possible to receive additional information of a product that can be updated in real time by transmitting information on a product recognized in an AI recognition model to a server.

A mobile artificial neural network device according to various embodiments of the present disclosure has an effect of further improving a product recognition rate (%) by using product information and additional product information.

A mobile artificial neural network device according to various embodiments of the present disclosure has an effect of assisting a reasonable online or offline purchase by using information on a product recognized by an AI recognition model and additional information on a product searched from a server.

Provided are a mobile artificial neural network device according to various embodiments of the present disclosure, and an AI recognition model that can minimize the decrease in the recognition rate (%) of a product while reducing an amount of calculation or power consumption of an artificial neural network processor. Thus, there is an effect of reducing the amount of calculation and power consumption, while minimizing the decrease in the recognition rate of products.

The effects according to the present disclosure are not limited by the contents exemplified above, and various additional effects are included in the present specification.

BRIEF DESCRIPTION OF THE DRAWINGS

FIG. 7A is a schematic diagram illustrating a difference in recognition rates between a quantized AI recognition model and an unquantized AI recognition model.

FIG. 7B is a schematic diagram illustrating energy consumption per unit operation of the processor 150 according to quantization.

DETAILED DESCRIPTION OF THE DISCLOSURE

Figure 1:
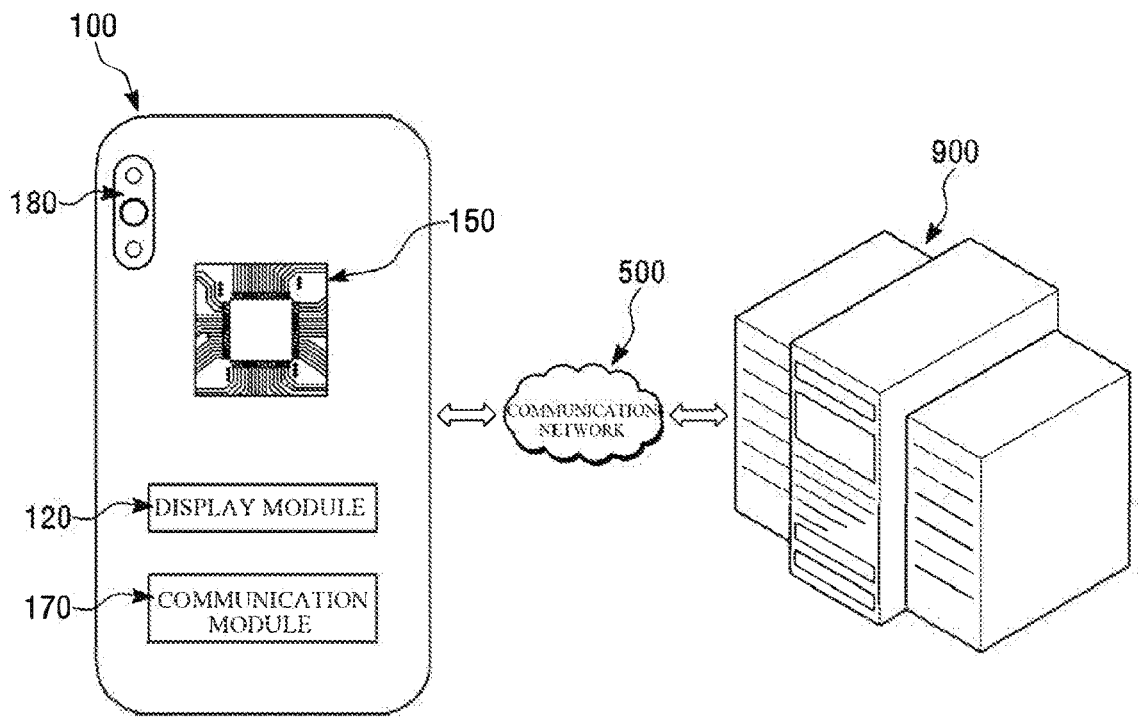
FIG. 1 is a schematic diagram illustrating a mobile artificial neural network device configured to recognize product information according to embodiments of the present disclosure.

Advantages and features of the present disclosure, and a method of achieving them will become apparent with reference to various embodiments described below in detail with reference to the accompanying drawings. However, the present disclosure is not limited to the embodiments described below and may be implemented in various forms different from each other, and the embodiments of the present disclosure are merely provided to completely inform the scope of the invention to those of ordinary skill in the art to which the present disclosure belongs, and the present disclosure is only defined by the scope of the claims.

A detailed description of the present disclosure may be described with reference to the drawings for convenience of description as an example of a specific embodiment in which the present disclosure may be practiced. Although elements of the various embodiments of the present disclosure are different from each other, a manufacturing method, an operation method, an algorithm, a shape, a process, a structure, and a characteristic described in a specific embodiment may be combined with or included with other embodiments. Further, the location or arrangement of individual components within each disclosed embodiment may be changed without departing from the spirit and scope of the present disclosure. Each feature of the various embodiments of the present disclosure may be partially or wholly combined or combined with each other, as those skilled in the art can fully understand, technically, various interlocking and driving are possible, and each of the embodiments may be implemented independently of each other or may be implemented together in a related relationship.

Since the shapes, sizes, ratios, angles, numbers, and the like disclosed in the drawings for describing the embodiments of the present disclosure are exemplary, the present disclosure refers to the drawings, but is not limited thereto. The same reference numerals refer to the same elements throughout the specification. Further, in describing the present disclosure, if it is determined that a detailed description of a related known technology may unnecessarily obscure the subject matter of the present disclosure, the detailed description may be omitted. In case of 'include', 'have', and 'consist of' mentioned in the present specification, other elements may be added unless 'only' is used. In the case of expressing the constituent elements in the singular, it includes the case of including the plural unless specifically stated otherwise. In the case of expressing an element in the singular, it includes the case of including the plural unless specifically stated otherwise. In interpreting the elements, it is interpreted as including a tolerance range even if there is no explicit description. In the case of a description of the positional relationship, for example, when the positional relationship of the two elements is described as 'on', 'on the upper portion', 'under', 'next to', or 'adjacent to', one or more other elements may be located between the two elements unless 'immediately' or 'direct' is used. When an element or layer is referred to as 'on' another element or layer, it includes all cases in which another layer or another element is interposed directly on or another layer or another element is interposed therebetween.

Figure 2:
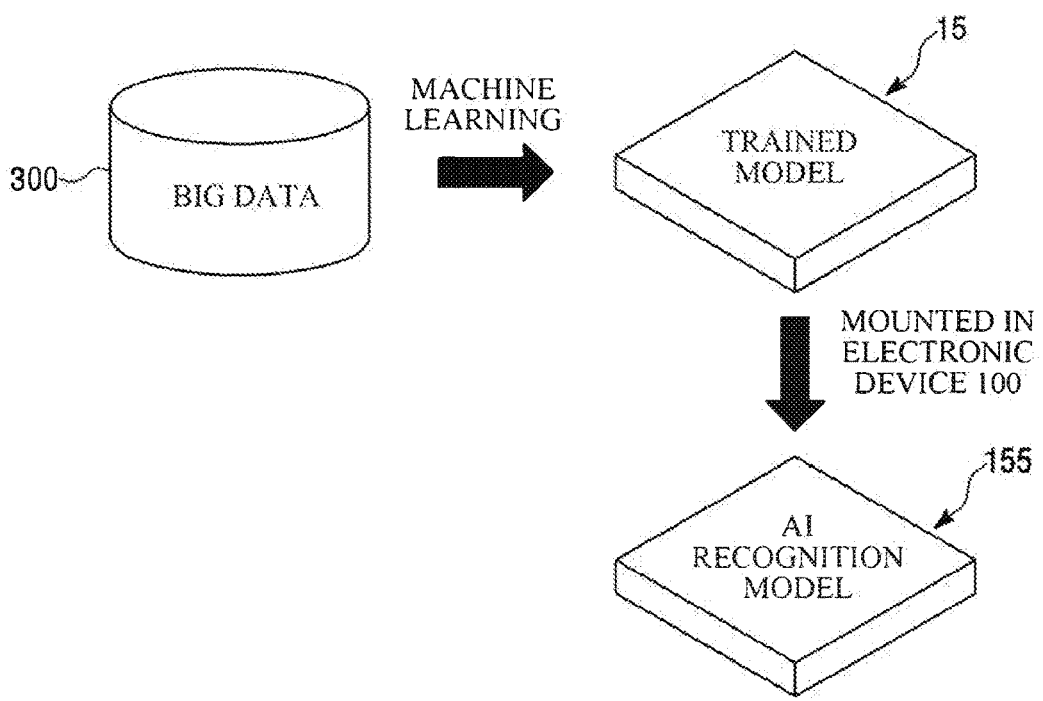
FIG. 2 is a schematic diagram for explaining an AI recognition model included in a mobile artificial neural network device according to embodiments of the present disclosure.

FIG. 1 is a schematic diagram illustrating a mobile artificial neural network device configured to recognize product information according to embodiments of the present disclosure. FIG. 2 is a schematic diagram for explaining an AI recognition model included in a mobile artificial neural network device according to embodiments of the present disclosure.

The mobile artificial neural network device 100 according to the first embodiment of the present disclosure may communicate with the server 900 through the communication network 500. However, it is not limited thereto.

The communication network 500 may use a well-known communication network such as Wi-Fi, LTE, 3G, 4G, and 5G, and embodiments of the present disclosure are not limited to the communication network 500.

The server 900 may refer to various servers capable of communicating with the mobile artificial neural network device 100 and may be a shopping mall server that can search for a variety of product information, a server that trains an AI recognition model, a server that distributes an AI recognition model that learns specific products, and the like, and embodiments of the present disclosure are not limited to the server 900.

Hereinafter, the mobile artificial neural network device 100 according to the first embodiment of the present disclosure will be described in detail.

The mobile artificial neural network device 100 according to the first embodiment of the present disclosure may be configured to include a display module 120, an artificial neural network processor 150, and a camera 180.

The mobile artificial neural network device 100 according to the first embodiment of the present disclosure is illustrated as a smart phone in FIG. 1, but is not limited thereto, and is also possible to be implemented as an electronic device such as a smart phone, a tablet PC, a personal computer, a notebook, and the like.

The artificial neural network processor 150 of the mobile artificial neural network device 100 is configured to drive the AI recognition model 155. The AI recognition model 155 refers to an artificial neural network that has been machine-learned to recognize a specific product. The AI recognition model 155 will be described later with reference to FIGS. 2 to 4.

The artificial neural network processor 150 refers to a processor configured to efficiently perform an artificial neural network operation required by the AI recognition model 155. For example, the artificial neural network processor 150, capable of artificial neural network operation, may be one among a central processing unit (CPU), a graphics processing Unit (GPU), a microcontroller unit (MCU), a digital signal processor (DSP), and a neural processing unit (NPU). In addition, the artificial neural network processor 150 may be a system-on-chip (SoC) including at least two of a CPU, a GPU, an MCU, a DSP, and an NPU. However, it is not limited thereto. The artificial neural network processor 150 may be configured as a separate chip separated from an application processor (AP), which is a main processor and is included in the mobile artificial neural network device 100. In this case, the artificial neural network processor 150 configured with a separate dedicated chip may be implemented as an NPU. The artificial neural network processor 150 is configured to have an operation structure optimized for artificial neural network operation. That is, it is configured to have a structure similar to that of an artificial neural network. Accordingly, the artificial neural network processor 150 has an effect of providing superior performance compared to a conventional processor when performing tasks such as image processing and object recognition. In addition, in terms of power consumption, since the relatively low power consumption characteristics are superior to that of the conventional processor, when the mobile artificial neural network device 100 recognizes product information, there is an effect that the mobile artificial neural network device 100 can perform calculation processing quickly with relatively low power consumption.

The artificial neural network processor 150 of the mobile artificial neural network device 100 according to the first embodiment of the present disclosure may recognize a product at a specific frame rate/sec. The camera 180 of the mobile artificial neural network device 100 may be configured to record a product at a rate of, for example, 60 Hz, 30 Hz, or 15 Hz (or sixty, thirty, or fifteen frames per second). In addition, the artificial neural network processor 150 may be configured to output a product recognition result at a specific frame rate.

The mobile artificial neural network device 100 provides a video of a product from the camera 180 to the AI recognition model 155 at a first frame rate. The artificial neural network processor 150 drives the AI recognition model 155 at the first frame rate to recognize product information from the video. The display module 120 may display a video of a product filmed by the camera 180 in real time and may display information of the product recognized by the AI recognition model 155 on the video of the product to implement augmented reality.

In other words, the mobile artificial neural network device 100 may display a video captured on the display module 120 and simultaneously input the video to the AI recognition model 155. The artificial neural network processor 150 may drive the AI recognition model 155 to obtain information on the recognized product. Product information may be displayed together with an image on the display module 120.

The mobile artificial neural network device 100 according to the first embodiment of the present disclosure has an effect of realizing augmented reality by displaying product information on the display module 120 in real time while filming a product with the camera 180 in real time. Accordingly, the user utilizes the augmented reality implemented in the display module 120 of the mobile artificial neural network device 100, and thus, in the embodiment of the present disclosure, there is an effect of intuitively obtaining product information.

The mobile artificial neural network device 100 provides the video of the product from the camera 180 to the AI recognition model 155 at a first frame rate, and the artificial neural network processor 150 may recognize product information from the video by driving the AI recognition model 155 at the second frame rate. At this time, the display module 120 may display a video of a product filmed by the camera 180 at a first frame rate, and information on a product recognized by the AI recognition model 155 may be displayed at a second frame rate. Accordingly, it is possible to implement augmented reality by displaying product information displayed at the second frame rate on the video of the product displayed at the first frame rate. In this case, the second frame rate may be equal to or slower than the first frame rate.

If the camera 180 of the mobile artificial neural network device 100 according to the first embodiment of the present disclosure drives the first frame rate, and if the artificial neural network processor 150 drives the AI recognition model 155 at the second frame rate, there is an effect of reducing power consumption of the artificial neural network processor 150 than when the artificial neural network processor 150 operates at the first frame rate.

The mobile artificial neural network device 100 according to the first embodiment of the present disclosure may be configured to further include a battery 130. Since the mobile artificial neural network device 100 is operated by the power of the battery 130, the user can easily search for information on a product to be searched using the mobile artificial neural network device 100 while moving. The operating speed of the artificial neural network processor 150, that is, the frame rate may be configured to be variable according to specific conditions.

For example, the camera 180 of the mobile artificial neural network device 100 or the artificial neural network processor 150 may reduce the first frame rate when the remaining charge of the battery 130 falls below a threshold value. The threshold value may be set as, for example, 30% of the remaining amount of the battery 130, and is not limited thereto. For example, when the first frame rate is 60 Hz, it may be lowered to 30 Hz under certain conditions.

According to the above-described configuration, even if the remaining charge of the battery 130 of the mobile artificial neural network device 100 falls below a certain level or a threshold value, the operation speed of the camera 180 or the artificial neural network processor 150 is higher than the threshold value. By setting the operating speed of the camera 180 or the artificial neural network processor 150 to be lower than when operating above the threshold value, there is an effect that power consumption of the mobile artificial neural network device 100 can be reduced and the operating time can be extended.

If the AI recognition model is not implemented in the mobile artificial neural network device and is implemented in the server, the amount of data transmission compared to the video information inevitably increases rapidly because high-definition video must be transmitted to the Internet server in real time. The AI recognition model must sequentially process a large number of unspecified recognition requests. However, it is difficult in practice for the user to monopolize the AI recognition model located on the server in real time, and there may be a problem that the response speed is delayed or the connection is disconnected depending on the number of users connected to the server. To further explain, it was easy to implement product recognition from image files such as photos when the AI recognition model is located on the server, but in practice, there is a technical difficulty implementing augmented reality that can display product recognition results in real time from video captured by a camera. However, when the artificial neural network processor 150 driving the AI recognition model 150 is included in the mobile artificial neural network device 100, there is an effect of improving the above-described problems.

If the AI recognition model recognizes product information in real time while receiving a real-time captured video, the recognition rate (%) can be improved compared to recognizing product information with a photo.

For example, when a user uses the mobile artificial neural network device 100 to recognize product information of a hand cream, when taking a picture, the user should shoot the product at a specific angle, and take the focus and composition into consideration. At this time, if the focus and composition of the photo is not good, the recognition rate (%) of the AI recognition model 155 may be decreased.

However, in the case of filming a product in real time, the user may film while rotating the product, and the recognition rate (%) of the AI recognition model 155 may be improved by providing video of the product from various angles. In addition, if different product information exists on the front and back of the product, for example, if there is a product name on the front and a barcode on the back, in case of taking a picture, at least two pictures must be supplied to the AI recognition model, and that the two pictures are related to each other must be recognized by the mobile artificial neural network device 100. However, if the user films while rotating the product around the product while operating the AI recognition model 155 in real time, the AI recognition model 155 can determine the continuity of the images, and information on the front and back sides is also provided sequentially, and thus, the recognition rate (%) can be improved.

That is, the AI recognition model 155 may determine the continuity of images of a video of products input from various angles and may accumulate information of different products among product information. For example, the accumulated product information may be at least one of a shape, a color, a trademark, a name, a manufacturer, and a barcode of the product. Therefore, the AI recognition model 155 recognizes consecutive images of a video of products input from various angles and recognizes information of different products from product information. At this time, information of different products may be combined.

The mobile artificial neural network device 100 according to the first embodiment of the present disclosure may be practiced with a modification.

For example, the mobile artificial neural network device 100 may be configured of a camera 180 for filming a product that the user wants to search for at a first frame rate, an artificial neural network processor 150 configured to receive a video of the camera 180 at a first frame rate and to recognize product information of the video at a first frame rate through the AI recognition model 155, a communication module 170 configured to transmit the recognition result to the server 900 and to receive a search result corresponding to the transmitted recognition result from the server 900, and a display module 120 that displays an augmented reality in which a search result is displayed on a video being filmed in real time by the camera 180.

To further explain, the mobile artificial neural network device 100 is configured to transmit and receive data by being connected to the server 900 through a communication network 500 capable of communicating with the communication module 170. For example, the mobile artificial neural network device 100 transmits product information recognized by the AI recognition model 155 driven by the artificial neural network processor 150 to the server 900 through the communication network 500. In addition, the mobile artificial neural network device 100 is configured to receive a search result of the server 900.

To further explain, the mobile artificial neural network device 100 may process product information output from the AI recognition model 155 into information in the form of a query and may transmit it to the server 900. A query is a request for information to be searched in the database of the server 900. That is, the mobile artificial neural network device 100 does not transmit the captured video to the server 900, but transmits only the product information output from the AI recognition model 155 to the server 900. The communication module 170 is configured so that the mobile artificial neural network device 100 transmits the output product information to the server 900 through the communication network 500. The artificial neural network processor 150 may receive product information output from the AI recognition model 155, may provide it to the communication module 170, and may transmit information on a product to the server 900 through the communication network 500 provided with the communication module 170.

According to the above configuration, modified embodiment of the mobile artificial neural network device 100 has an effect of implementing the augmented reality by searching the server 900 for product names and prices in real time while filming a product with the camera 180 in real time, and displaying the searched product information on the display module 120. Therefore, there is an effect that the user can conveniently and quickly search the information on the filmed product and make a reasonable online or offline purchase.

Some elements of the mobile artificial neural network device 100 according to the first embodiment of the present disclosure may be excluded, and various modifications may be made. For example, the first embodiment of the present disclosure may be modified into a fixed artificial neural network device that does not require mobility, and in this case, the battery element may be excluded. For example, the first embodiment of the present disclosure may be implemented with a mobile artificial neural network device excluding a camera, and in this case, a separate camera may be connected with the mobile artificial neural network device.

Referring to FIG. 2, the AI recognition model 155 refers to a model 15 that is trained in a separate machine-learning device to perform an object recognition function. The AI recognition model 155 may be embedded in the artificial neural network processor 150 or stored in a separate memory of the mobile artificial neural network device 100. When the AI recognition model 155 is operated, it may be implemented in a manner that is loaded into the artificial neural network processor 150.

As shown in FIG. 2, the model 15 machine-learned with big data 300 prepared in advance may be stored in the mobile artificial neural network device 100. Further, the trained model 15 may be referred to as an AI recognition model 155.

The generation of the trained model 15 may be performed in a separate machine-learning device. In the machine-learning device, the trained model 15 may be obtained by repeatedly machine-learning the big data 300 on an artificial neural network prepared in advance. It will be described in more detail with reference to FIGS. 3A and 3B.

Figure 3A:
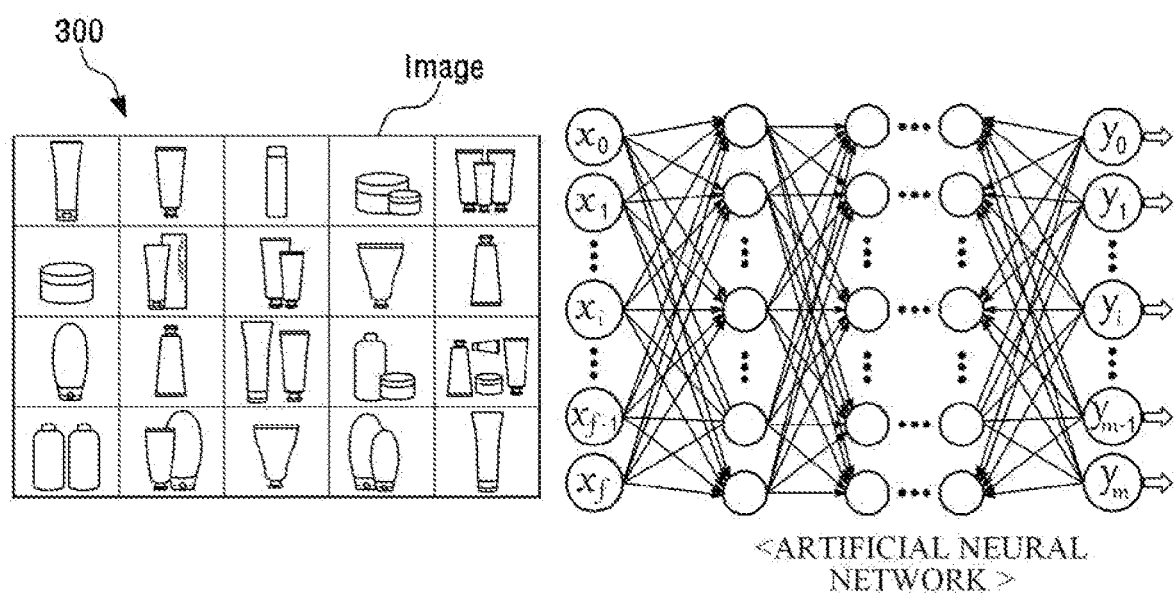
FIGS. 3A and 3B are diagrams for explaining several examples of machine-learning methods for obtaining the learned AI recognition model shown in FIG. 2.
Figure 3B:
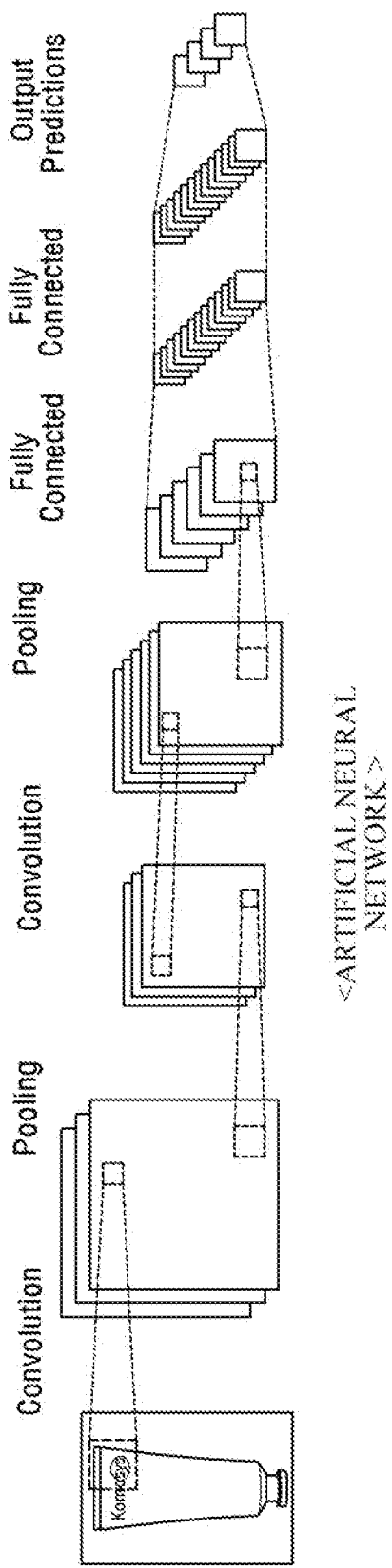

FIGS. 3A and 3B are diagrams for explaining several examples of machine-learning methods for obtaining the learned AI recognition model shown in FIG. 2.

Referring to FIG. 3A, the trained model 15 shown in FIG. 2 can be obtained by machine-learning the artificial neural network by repeatedly providing big data 300 to the fully connected artificial neural network as shown on the right.

As an example of an artificial neural network, the artificial neural network may include an input node ($x0, x1, \ldots, xi, \ldots, xf-1, xf$) into which an image is input, an output node ($y0, y1, \ldots, yi, \ldots, ym-1, ym$) which outputs product information of the input image, hidden nodes between the input node ($x0, x1, \ldots, xi, \ldots, xf-1, xf$) and the output node ($y0, y1, \ldots, yi, \ldots, ym-1, ym$), and multiple associated parameters (weight) between the output node ($y0, y1, \ldots, yi, \ldots, ym-1, ym$) and the input node ($x0, x1, \ldots, xi, \ldots, xf-1, xf$).

The input node ($x0, x1, \ldots, xi, \ldots, xf-1, xf$) is a node configuring an input layer and receives an image from the outside, and the output node ($y0, y1, \ldots, yi, \ldots, ym-1, ym$) is a node configuring an output layer and outputs predetermined output data to the outside. The hidden nodes disposed between the input node ($x0, x1, \ldots, xi, \ldots, xf-1, xf$) and the output node ($y0, y1, \ldots, yi, \ldots, ym-1, ym$) are nodes configuring a hidden layer and connect output data of the input node ($x0, x1, \ldots, xi, \ldots, xf-1, xf$) to input data of the output node ($y0, y1, \ldots, yi, \ldots, ym-1, ym$). Three hidden layers are illustrated in FIG. 3A, but according to an embodiment, a neural network circuit may be implemented by disposing a plurality of hidden layers, for example, two or four or more hidden layers, between the input layer and the output layer.

Each input node ($x0, x1, \ldots, xi, \ldots, xf-1, xf$) of the input layer may be fully connected or incompletely connected to each output node ($y0, y1, \ldots, yi, \ldots, ym-1, ym$) of the output layer, as illustrated in FIG. 3A.

The input node ($x0, x1, \ldots, xi, \ldots, xf-1, xf$) serves to receive input data from the outside and deliver it to the hidden node. Then, a practical calculation is performed in the hidden node. After output data is output from the hidden node, the output node ($y0, y1, \ldots, yi, \ldots, ym-1, ym$) receives the output data and performs calculation again. When performing calculations in the hidden node and the output node ($y0, y1, \ldots, yi, \ldots, ym-1, ym$), the calculation is performed by multiplying the input data that is input to an own node by a predetermined associated parameter (or weight, w). After resultant calculation values performed in respective nodes are summed (weighted sum), predetermined output data is output by passing the sum through a preset activation function.

The hidden node and the output node ($y0, y1, \ldots, yi, \ldots, ym-1, ym$) have an activation function. The activation function may be one among a step function, a sign function, a linear function, a logistic sigmoid function, a hyper tangent function, a ReLU function, and a softmax function. The activation function may be appropriately determined by a skilled person according to a learning method of an artificial neural network.

The artificial neural network performs machine-learning by repeatedly updating or modifying the associated parameter (w) to an appropriate value. Representative methods of machine-learning by the artificial neural network include supervised learning and unsupervised learning.

Supervised learning is a learning method in which the associated parameter (w) is updated so that output data obtained by putting the input data into the neural network becomes close to the target data when there is a clearly defined target output data that is expected to be computed by an arbitrary neural network from input data. A multilayer structure of FIG. 3A may be generated based on supervised learning.

Referring to FIG. 3B, illustrating another example of the artificial neural network, there is a convolutional neural network (CNN), which is a type of deep neural network (DNN). A convolutional neural network (CNN) is a neural network having one or several convolutional layers, a pooling layer, and a fully connected layer. The convolutional neural network (CNN) has a structure suitable for training two-dimensional data and can be trained through a back-propagation algorithm. It is one of the representative models of DNN that is widely used in various application fields such as object classification and object detection in images.

Meanwhile, the AI recognition models according to various embodiments of the present disclosure may be DNN, but are not limited thereto. For example, AI recognition models may be based on at least one selected algorithm among VGG net, R, DenseNet, a fully convolutional network (FCN) having an encoder-decoder structure, SegNet, DeconvNet, DeepLAB V3+, and a deep neural network (DNN) such as U-net, SqueezeNet, Alexnet, ResNet18, MobileNet-v2, GoogLeNet, Resnet-v2, Resnet50, Resnet101, and Inception-v3. Furthermore, the AI recognition models may be ensemble models based on at least two algorithm models among the aforementioned algorithms.

Here, it should be noted that the artificial neural network of the present disclosure is not limited to the artificial neural network shown in FIGS. 3A and 3B, and the trained model 15 may be obtained by machine-learning the big data 300 in various other artificial neural networks.

Referring to FIG. 2 again, the big data 300, which is prepared in advance, includes a training set for machine-learning of the artificial neural network described above. As illustrated in FIG. 4, the training set of the big data 300 includes a plurality of product images and product information labels of the corresponding product images. Product information labels (Label 1, . . . , Label 10, . . . , Label 100, . . . , Label 1000) corresponding to each of a plurality of product images (Image 1, . . . , Image 10, . . . , Image 100, . . . , Image 1000) are prepared in advance.

The product information label corresponding to each product image is configured to include information on at least one of product shape, color, trademark, name, manufacturer, and barcode.

The prepared training set may be provided to the artificial neural network illustrated in FIG. 3A or 3B to acquire the trained model 15 illustrated in FIG. 2. The acquired trained model 15 is mounted on the mobile artificial neural network device 100 as shown in FIG. 2 to become an AI recognition model 155.

When an image of a specific product is captured by the AI recognition model 155 mounted on the mobile artificial neural network device 100 according to the first embodiment of the present disclosure, the AI recognition model 155 outputs product information corresponding to the input image. Here, the product information may output at least one of the product shape, color, trademark, name, manufacturer, and barcode corresponding to the product information label of the training set. Specifically, when an image is received, the AI recognition model 155, may output a probability value (%) for each information of a plurality of products classified in advance, that is, a recognition rate (%), may infer the information of the product with the largest probability value (%) among the probability values (%) for each information of the output product as information of the product corresponding to the input image, and may output inferred product information. At this time, the product information may be configured to output a recognition rate (%).

However, the AI recognition model 155 may output information on a product having the highest probability value, but is not limited thereto, and may output information on a plurality of products in the order of the highest probability value. In this case, the display module 120 has an effect of providing an augmented reality in which a video of a filmed product and information of at least one product are simultaneously displayed. In addition, the user may select the desired product information when information on at least one product is displayed.

The mobile artificial neural network device 100 according to the first embodiment of the present disclosure has the advantage of realizing augmented reality while filming a product in real time, but is not limited thereto, and it may be modified to implement the same function using a picture taken by the camera 180.

The mobile artificial neural network device 100 according to the second embodiment of the present disclosure is configured to update the AI recognition model 155.

The portable artificial neural network apparatus according to the second embodiment of the present disclosure 100 is substantially similar to the mobile artificial neural network device 100 according to the first embodiment of the present disclosure, except that the AI recognition model 155 can be updated, and thus, the redundant description hereinafter may be omitted only for convenience of description.

As described above, when the learning is completed and the AI recognition model 155 stored in the mobile artificial neural network device 100 recognizes a brand-new product, the recognition rate (%) of the product may decrease. That is, the AI recognition model 155, which has not learned a new product, may be recognized as a similar product that has already been learned, but may not accurately recognize the new product. However, it is not easy for the AI recognition model 155 stored in the mobile artificial neural network device 100 to learn by itself for recognition of brand-new products.

Accordingly, the mobile artificial neural network device 100 according to the second embodiment of the present disclosure is configured to update the pre-stored AI recognition model 155.

For example, the server 900 may update the AI recognition model 155 mounted on the mobile artificial neural network device 100. Specifically, the server 900 may change a parameter (weight w) and/or a bias (b) of the artificial neural network of the AI recognition model 155. By updating the AI recognition model 155, the recognition rate of product information may be improved. The artificial neural network processor 150 of the mobile artificial neural network device 100 receives update information for updating the AI recognition model 155 from the server 900, and thus, the AI recognition model 155 may be updated based on the received update information, but is not limited thereto, and the mobile artificial neural network device 100 may update the AI recognition model 155 through a memory device such as a CD, DVD, USB, or HDD.

For example, when recognizing a product, the mobile artificial neural network device 100 may allow a user to input an update of the AI recognition model 155 when the recognition rate (%) is output below a threshold.

For example, the user may provide feedback to the server 900 on the product recognition result. Alternatively, the server 900 may transmit the update news of the new AI recognition model 155 to the mobile artificial neural network device 100. Alternatively, the mobile artificial neural network device 100 may update the newly trained AI recognition model 155 through the server 900 or an automatic update function, but is not limited thereto, and it is possible to instruct the update of the AI recognition model 155 through various methods.

For example, there may be at least one server 900. To further explain, a manufacturer of a specific product may periodically or as necessary update a training set in which information on newly released products is updated. For example, a manager of the big data 300 that sells sporting goods may update a training set in which information on products of newly released sporting goods is updated. In addition, the newly trained AI recognition model can be trained with an updated training set in a separate machine-learning device.

Accordingly, the mobile artificial neural network device 100 according to the second embodiment of the present disclosure uses the newly trained AI recognition model 155, thereby improving the recognition rate (%) of newly released products.

According to the mobile artificial neural network device 100 according to the second embodiment of the present disclosure, there is an effect that the previously stored AI recognition model 155 can be easily changed as necessary to an AI recognition model obtained by learning a newly released product from the outside.

The AI recognition model 155 of the mobile artificial neural network device 100 according to the third embodiment of the present disclosure is configured to store at least one AI recognition model 155.

The portable artificial neural network apparatus according to the third embodiment of the present disclosure 100 is substantially similar to the mobile artificial neural network device 100 according to the first embodiment of the present disclosure, except that a plurality of AI recognition models 155 can be stored, and thus, the redundant description hereinafter may be omitted only for convenience of description.

The mobile artificial neural network device 100 according to the third embodiment of the present disclosure is configured to include a plurality of AI recognition models 155. For example, the AI recognition model 155 may include a first AI recognition model and a second AI recognition model. Here, the first AI recognition model may be a recognition model that is learned to recognize as a product the sporting goods of a sporting goods manufacturer. The second AI recognition model may be a recognition model learned to recognize skin care products of a cosmetic product manufacturer. However, it is not limited thereto.

The plurality of AI recognition models 155 may have a specific hierarchy. For example, a product category can be stratified into a large classification, a medium classification, and a small classification.

For example, the first AI recognition model may be a model trained to recognize a category of a product, which is a large category. The first AI recognition model may be a model that has been trained to recognize product categories such as beverages, toys, cosmetics, and kitchen utensils and may recognize, for example, about 1000 product categories.

For example, the second AI recognition model may be a model trained to recognize products related to a category of a specific product of a large classification. For example, when the first AI recognition model recognizes beverages in a product category of a large category, the mobile artificial neural network device 100 may call a second AI recognition model that has learned to recognize beverages. In this case, the second AI recognition model may be a model trained to recognize product names of about 1000 beverages.

For example, the third AI recognition model may be a small classification recognition model that has been trained to recognize additional information of a product recognized in the middle classification. For example, it is possible to recognize whether the container of the recognized beverage is a glass bottle, a can, or a PET bottle, and the capacity of the container may be recognized.

Accordingly, the mobile artificial neural network device 100 calls a second AI recognition model corresponding to the large category product category recognized by the first AI recognition model, and thus, the second AI recognition model may recognize the product in more detail.

In addition, if necessary, the mobile artificial neural network device 100 calls a third AI recognition model corresponding to the middle category product category recognized by the second AI recognition model, and thus, the third AI recognition model can recognize the product in more detail.

The mobile artificial neural network device 100 according to the third embodiment of the present disclosure may be configured to be able to search and download a specific AI recognition model 155 through the server 900 as necessary.

For example, the mobile artificial neural network device 100 may film a brand, logo, or QR code of a specific store with the camera 180, may search through the server 900 for the AI recognition model 155 that has learned the corresponding product, and may store the searched AI recognition model 155 in the mobile artificial neural network device 100.

Therefore, according to the third embodiment of the present disclosure, the mobile artificial neural network device 100 has an effect of providing product information at a high recognition rate (%) by using a specific AI recognition model having a high recognition rate (%) among the AI recognition models 155.

Therefore, since the mobile artificial neural network device 100 according to the third embodiment of the present disclosure is configured to include a plurality of different AI recognition models, there is an effect of improving the recognition rate (%) of a specific product.

Therefore, as the mobile artificial neural network device 100 according to the third embodiment of the present disclosure is configured to include a plurality of hierarchical AI recognition models, there is an effect of dramatically improving the number of recognizable products while improving the recognition rate (%) of a specific product.

Therefore, the mobile artificial neural network device 100 according to the third embodiment of the present disclosure may search for a product or brand desired by the user with the AI recognition model 155, may search for an additional AI recognition model that has learned more detailed product information related to the recognition result, and may store the searched AI recognition model in the mobile artificial neural network device 100.

The mobile artificial neural network device 100 according to the fourth embodiment of the present disclosure is characterized in that the AI recognition model 155 is configured to store an AI recognition model 155 capable of recognizing a barcode or a QR code.

The mobile artificial neural network device 100 according to the fourth embodiment of the present disclosure is characterized in that it is configured to include an AI recognition model 155 that is learned to recognize unique identification information of a product, for example, an identification code or a barcode. Here, the AI recognition model 155 may be configured to simultaneously recognize product information and barcodes with one AI recognition model, or may be configured to further include an AI recognition model learned to recognize only separate barcodes.

The AI recognition model 155 is characterized by being trained to recognize a GS1 standard product identification code or barcode.

The GS1 standard product identification code is a code used for product identification and refers to a product identification code that follows an industrial, national, or internationally agreed system. The GS1 standard product identification code is an international standard product identification code managed and distributed by GS1, which is composed of a network of 110 countries around the world.

Figures 4A, 4B:
FIG. 4A is a diagram illustrating an example of a training set.
FIG. 4B is a schematic diagram for explaining an identification code and a barcode.

FIG. 4B is a schematic diagram for explaining an identification code and a barcode. Referring to FIG. 4B, the barcode means that the identification code is expressed in a bar shape so that the machine can read it. It is configured that by changing the thickness of the bar and the width of the space between the bar and the bar, the identification code is displayed and the machine can read it optically.

The GS1 standard identification code for a single product is characterized by being unique worldwide. In other words, the GS1 standard identification code for the same product is the same worldwide. Since only one GS1 standard identification code is assigned to one product, there is an advantage that the same GS1 identification code is not assigned to different products.

The mobile artificial neural network device 100 may recognize a barcode or an identification code and may transmit the recognized product information to the server 900 in order to receive additional product information from the server 900. To further explain, the identification code does not contain information such as product name and price. Accordingly, the recognized GS1 standard identification code information may be obtained from the server 900 including the GS1 standard identification code database.

According to the above configuration, the mobile artificial neural network device 100 according to the fourth embodiment of the present disclosure recognizes a barcode and receives a search result corresponding to the barcode to the server 900. Thus, there is an effect of further improving additional product information and product recognition rate (%). In addition, even if the AI recognition model 155 does not learn about a specific product, the product information may be searched from the database of the server 900 by recognizing the GS1 standard identification code or barcode, and thus, there is an effect of further improving the recognition rate (%) of the product.

The mobile artificial neural network device 100 according to the fifth embodiment of the present disclosure display the product information 160 recognized by the AI recognition model 155 on the display module 120, send product information 160 to the server 900, search for additional product information 165 through the server 900, and provide product information 160 and additional product information 165 to the user. Accordingly, the mobile artificial neural network device 100 may provide additional information on a product that can help shopping.

Figure 5:
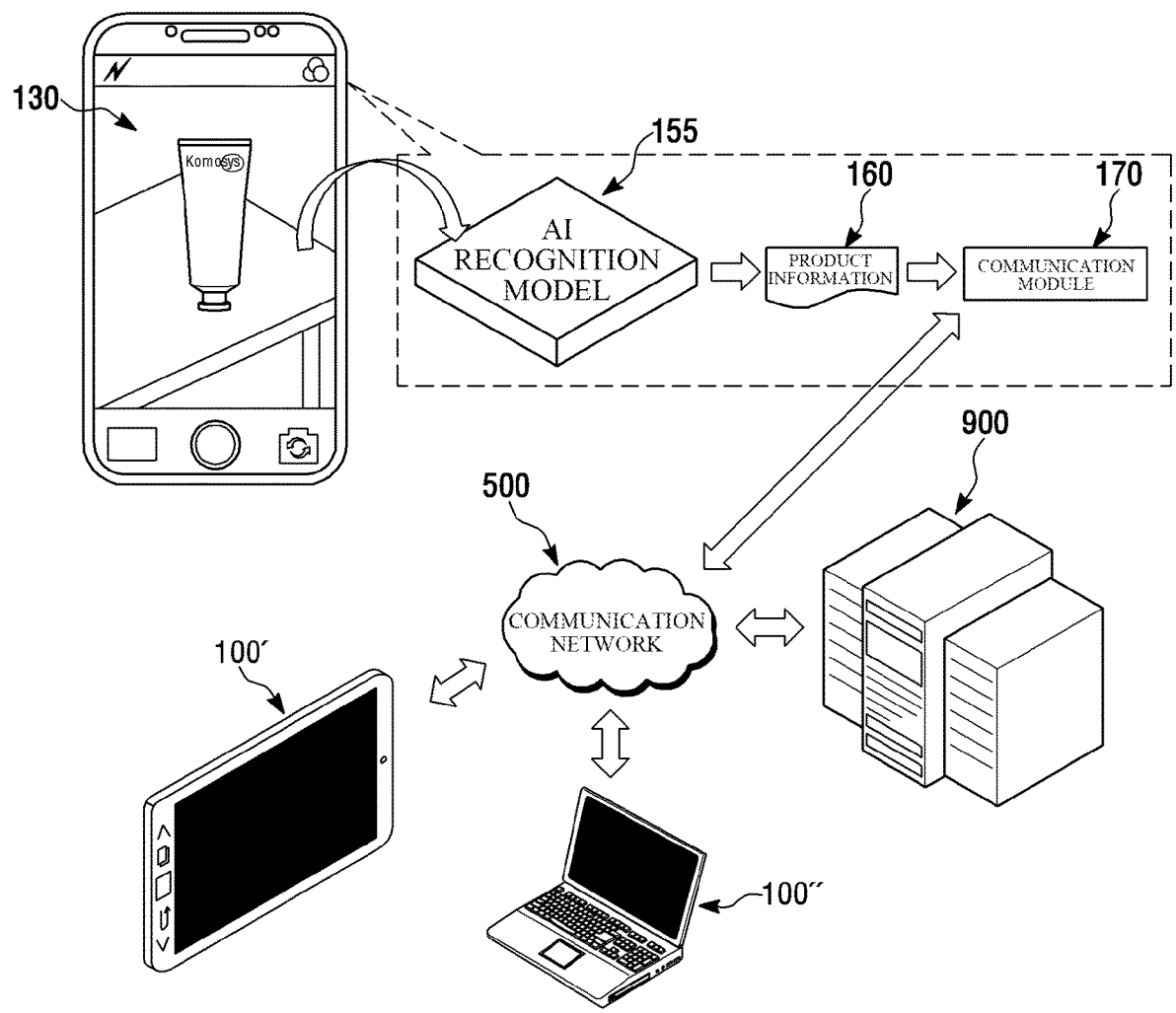
FIG. 5 is a diagram illustrating a method of providing additional information on a product according to a fifth embodiment of the present disclosure.
Figure 6:
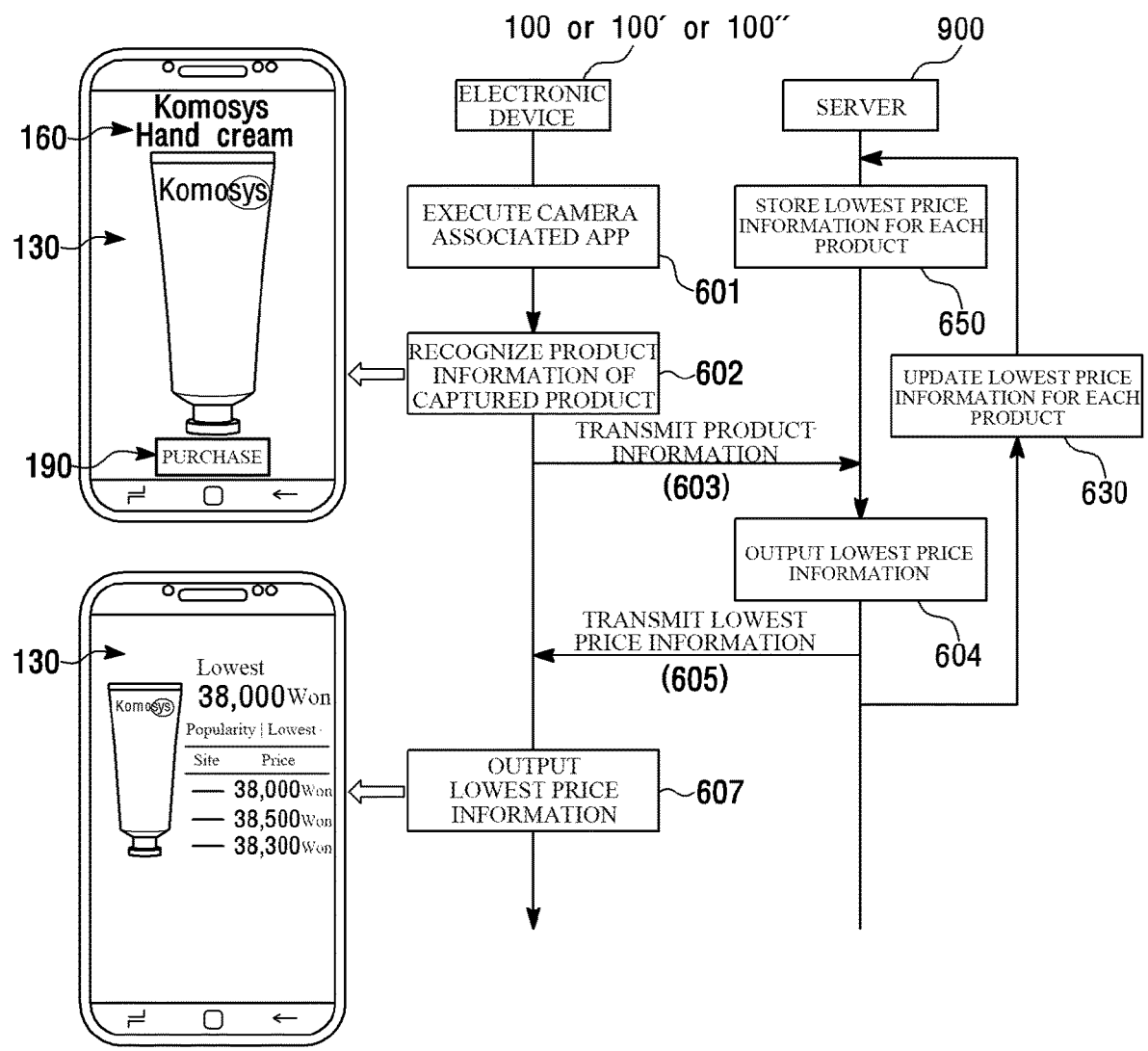
FIG. 6 is a flowchart of a method for providing additional information on a product according to the fifth embodiment of the present disclosure illustrated in FIG. 5.

FIG. 5 is a diagram illustrating a method of providing additional information on a product according to a fifth embodiment of the present disclosure, and FIG. 6 is a flowchart of a method for providing additional information on a product according to the fifth embodiment of the present disclosure illustrated in FIG. 5.

Referring to FIGS. 5 and 6, a camera-linked application installed in the mobile artificial neural network device 100 is executed 601 by a user. Here, the camera-linked application (or "app") may be a camera app basically installed in the mobile artificial neural network device 100 or may be a shopping app capable of communicating with the server 900 while driving and controlling the camera 180 of the mobile artificial neural network device 100.

When the camera-linked app is executed (601) in the mobile artificial neural network device 100, a video captured by the camera 180 is displayed on the display module 120, and the AI recognition model 155 may receive the video. When a user moves the mobile artificial neural network device 100 to film a specific product, for example, a hand cream, a hand cream video may be displayed on the display module 120. At this time, the AI recognition model 155 attempts to recognize the product using the received hand cream video.

Next, the camera 180 of the mobile artificial neural network device 100 provides a video to the AI recognition model 155, and the AI recognition model 155 recognizes (602) the product information 160 from the video. For example, the product information 160 may include at least one of a shape, a color, a trademark, a name, a manufacturer, and a barcode of the product included in the input video. However, it is not limited thereto, and various information capable of identifying the product may be included in the product information 160.

The mobile artificial neural network device 100 may simultaneously display a video of a product and recognize the product information 160 and the product video and product information 160 may be displayed on the display module 120 in real time to implement augmented reality.

The mobile artificial neural network device 100 may display product information 160 to a user and may display a search window 190 on the display module 120, asking whether to search for additional product information, for example, the lowest price information, a sales site, and the like through the server 900. Here, when a user touches the search window 190, that is, when input of a user is received through the search window 190, the mobile artificial neural network device 100 transmits the recognized product information 160 to the server 900.

The artificial neural network processor 150 of the mobile artificial neural network device 100 may control to transmit (603) the product information 160 recognized by the AI recognition model 155 to the server 900 through the communication module 170. Here, the artificial neural network processor 150 may process the product information recognized by the AI recognition model 155 into information in the form of a query and transmit it to the server 900.

On the other hand, when the user moves the mobile artificial neural network device 100 so that the product does not appear in the video, the product information 160 may not be transmitted to the server 900.

The server 900 receiving the product information 160 outputs (604) additional information corresponding to the received product information 160. Here, the additional information on the product may include the lowest price information corresponding to the information on the product.

The server 900 transmits (605) additional information including the lowest price information to the mobile artificial neural network device 100 through the communication network 500. Here, the server 900 may process the additional information into information in the form of a query and may transmit it to the mobile artificial neural network device 100.

The mobile artificial neural network device 100 receives additional product information including the lowest price information from the server 900 through the communication module 170. The artificial neural network processor 150 of the mobile artificial neural network device 100 outputs (607) the received additional information to the display module 120 of the mobile artificial neural network device 100. Here, the artificial neural network processor 150 may display the additional information of the product including the received lowest price information on the display module 120 as shown in FIG. 6 in a preset manner.

When the user selects a shopping mall desired by the user from the lowest price information displayed on the display module 120 of the mobile artificial neural network device 100, the artificial neural network processor 150 may display a purchase page of a corresponding product of the selected shopping mall on the display module 120.

Meanwhile, the server 900 pre-stores 650 additional information on products including information on the lowest price for each product. In addition, the server 900 may update 630 and store additional product information including the lowest price information for each product in real time or periodically.

In addition, the server 900 may transmit additional product information corresponding to product information provided from a mobile artificial neural network device 100' or 100", other than the mobile artificial neural network device 100, to another mobile artificial neural network device 100' or 100".

In this manner, according to the method of providing additional information of a product according to the fifth embodiment of the present disclosure, a user can obtain the brand and source of the product they want in a short time and almost in real time through the artificial neural network-based AI recognition model 155 without searching through the touch screen. This is due to that a video containing a product is acquired through the camera 180 from the camera-linked app installed in the mobile artificial neural network device 100 and information on the product exist in the video obtained using the AI recognition model 155 is obtained.

In addition, according to the method for providing additional information on a product using an artificial neural network according to the fifth embodiment of the present disclosure, the captured product image does not need to be transmitted to the server 900, and the product image captured by the server 900 does not need to be analyzed. Thus, it is possible to provide additional information, including information on the lowest price, sales location, and inventory to the user in real time. This is because of that product information obtained through the AI recognition model 155, for example, product information converted into a query form, is transmitted to the server 900 through the communication network 500, and at the server 900, additional information including the lowest price information corresponding to the transmitted product information is searched and provided to the mobile artificial neural network device 100 through the communication network 500.

According to various embodiments of the present disclosure, the mobile artificial neural network device 100 is configured to be capable of processing a product of a video input from the camera 180 at a speed capable of realizing augmented reality.

In general, the server 900 is superior to the mobile artificial neural network device 100 in terms of processing speed of a processor, hardware resources such as memory, and processing performance. That is, since the mobile artificial neural network device 100 performs an operation at the server 900 level, the above-described technical difficulties exist.

The mobile artificial neural network device 100 according to the embodiments of the present disclosure is characterized in that it is configured to provide an optimized AI recognition model 155 and a processor 150 in consideration of hardware characteristics such as a limitedly provided battery and computing power of an arithmetic processing device and a storage capacity of a memory device.

That is, the AI recognition model 155 and/or the processor 150 according to the embodiments of the present disclosure may be configured to operate in a portable device rather than a high-performance server or super computer.

Specifically, the AI recognition model 155 can be lightened. Through lightening processes, for example, pruning, quantization, deep learning model parameter compression, transfer learning technology such as knowledge distillation, retraining-based lightening technology, AI-based lightening model optimization technology, and the like can enhance usability in portable devices. However, the present disclosure is not limited to the above-described lightening technology, and other lightening technologies may be used.

As a result, when the artificial neural network model is lightened, the hardware resources, computational power requirements, power consumption, heat generation, and the like required to implement the application service are proportionally reduced, and the computational performance increases, thus maximizing the utility in portable devices.

To further explain, pruning is a technology that converts the AI recognition model 155 to a smaller and more efficient manner as one of the deep learning lightening technologies. Specifically, pruning replaces small values close to zero among associated parameters (w) or weight values of the artificial neural network with zero. The artificial neural network operation includes a vast matrix multiplication, and since the weight value that becomes 0 makes the result of the multiplication to 0 regardless of the value of the other operand in the multiplication, in this case, the result value can be derived without actually executing the multiplication operation. For example, in a deep learning model such as VGG16, even if a weight value of 90 percent or more is substituted with 0, there is little reduction in the recognition rate (%), so about 90 percent of the total inference calculation can be performed without actual hardware calculation. Therefore, the pruned AI recognition model 155 has an effect of providing an advantage suitable for being applied to the mobile artificial neural network device 100.

To further explain, quantization is a technique for reducing the number of bits of data. Specifically, data input to nodes of an input layer, a hidden layer, and an output layer of the AI recognition model 155 may be quantized. That is, the number of bits of data can be reduced to a specific number of bits. For example, input data of 32-bit floating-point can be quantized to 16-bit, 8-bit, 4-bit, or 2-bit data. In addition, the associated parameter w of the AI recognition model 155, that is, a weight value may be quantized. That is, the number of bits of the associated parameter calculated with the data input to each node can be reduced to a specific number of bits. For example, a 32-bit floating-point associated parameter can be quantized to 16-bit, 8-bit, 4-bit, or 2-bit. That is, the mobile artificial neural network device 100 may be configured to perform a lower-bit mathematical operation with a quantized node and an associated parameter. The quantized AI recognition model 155 provides an advantage suitable for being applied to the mobile artificial neural network device 100.

To further explain, deep learning parameter compression or model compression compresses the value of the associated parameter (w) of the AI recognition model 155 or the activation map or feature map data using an existing data compression technique. Accordingly, the size of the AI recognition model 155 compressed into data of a smaller size may be reduced when stored in a memory device. In particular, since the size of the data used in the artificial neural network is vast, the data throughput can be reduced several times to tens of times through this compression, and the power consumption and delay time required for memory access can be reduced by the compressed AI recognition model 155. Therefore, the compressed AI recognition model 155 may provide an advantage suitable for being applied to the mobile artificial neural network device 100.

To further explain, knowledge distillation is a kind of transfer learning technology, which is a technology that learns a small artificial neural network model to be used in practice by using a large artificial neural network model that has been well learned in the past.

For example, a large artificial neural network that has been well-learned in the past may be an artificial neural network consisting of about 100 of an input layer, hidden layers, and an output layer, and a small artificial neural network is an artificial neural network consisting of about fifty layers of an input layer, hidden layers, and an output layer.

That is, a large artificial neural network model having a relatively large number of layers and a relatively large weight value can implement a relatively high level of artificial intelligence. However, it is difficult to easily implement high-level artificial intelligence in a hardware resource-constrained environment such as a portable device. In this case, if a lightened artificial neural network is trained using data and information of a large artificial neural network of high artificial intelligence that has been previously learned, a high level of artificial intelligence can be implemented in the lightened artificial neural network. Accordingly, the performance of the mobile artificial neural network device 100 having limited hardware resources can be improved.

To further explain, when applying various techniques for reducing weight of models, for example, quantization, pruning, and parameter compression, the recognition rate (%) of the AI recognition model 155 may decrease. In this case, the AI recognition model 155 may be retrained. In this case, the recognition rate (%) of the AI recognition model 155 may increase again. Accordingly, the performance of the mobile artificial neural network device 100 having limited hardware resources can be improved.

To further explain, AI-based lightened model optimization technologies, such as Neural Architecture Search or AutoML, are representative.

The AI-based lightening model optimization technology such that a method of creating an optimally lightened artificial neural network model through the process of searching the artificial neural network model structure through artificial intelligence such as reinforcement learning or lightening methods such as quantization, pruning, model compression, i.e., data compression, is not based on the conventional algorithms. This technology is a way for artificial intelligence to go through its own weight reduction process to achieve optimal weight reduction results. However, the present disclosure is not limited to the above-described lightening technology, and other lightening technologies may be used.

FIG. 7A is a schematic diagram illustrating a difference between a recognition rate (%) of a quantized AI recognition model and an unquantized AI recognition model.

Referring to FIG. 7A, an AI recognition model 155 implemented as a Resnet18 deep learning model that learned product recognition was quantized from 32-bit floating-point multiplication to 4-bit integer multiplication.

The recognition rate (%) ranged from 69.758% to 69.674%, and the actual reduction in recognition rate was negligible. In other words, there was no substantial reduction in recognition rate (%) due to quantization. The size of the weight value of the Resnet18 model before quantization is 44.6 MB, but the size of the weight value of the quantized model is reduced to 5.5 MB. Hence, as the size of the quantized AI recognition model 155 decreases, there is an effect of reducing the amount of memory storage requirement, the delay time required for memory access, power consumption during memory access, the amount of hardware resource demand in the NPU, the power consumption of the NPU, and the like, and there is an effect of increasing the computational performance of the artificial neural network of the NPU.

FIG. 7B is a schematic diagram illustrating energy consumption per unit operation of the processor 150 according to quantization.

Referring to FIG. 7B, energy consumption per unit operation of the processor 150 may be described as an addition operation and a multiplication operation. "8b Add" means an 8-bit integer addition operation. "16b Add" means a 16-bit integer addition operation. "32b Add" means a 32-bit integer addition operation. "16b FP Add" means a 16-bit floating point addition operation. "32b FP Add" means a 32-bit floating point addition operation. "4b Mult" means a 4-bit integer multiplication operation. "8b Mult" means an 8-bit integer multiplication operation. "16b Mult" means a 16-bit integer multiplication operation. "32b Mult" means a 32-bit integer multiplication operation. "16b FP Mult" refers to a 16-bit floating-point multiplication operation. "32b FP Mult" refers to a 32-bit floating-point multiplication operation. The energy unit is the pico-joule (pj).

When the processor 150 performs 32-bit floating-point multiplication and 4-bit integer multiplication, the energy consumption per unit operation is approximately 37 times different. That is, when the quantized AI recognition model 155 is calculated by the processor 150 of the mobile artificial neural network device 100, power consumption can be significantly reduced.

Figure 7C:
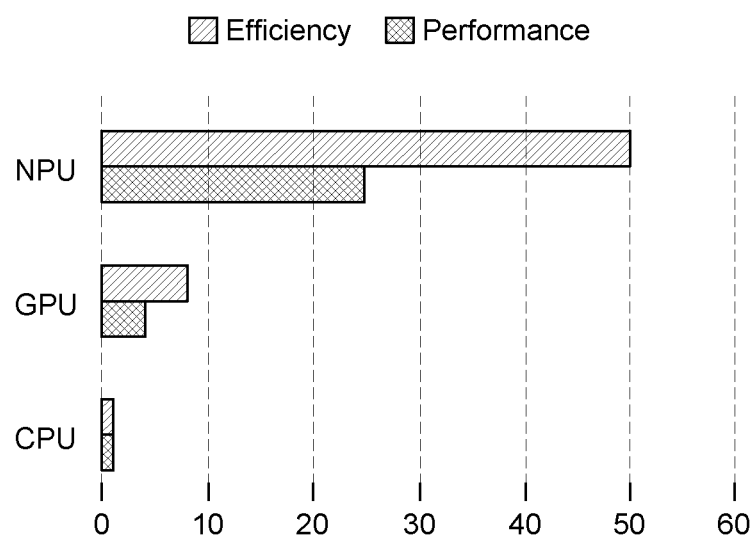
FIG. 7C is a schematic diagram illustrating operation efficiency and operation speed according to the type of processor 150.

FIG. 7C is a schematic diagram illustrating operation efficiency and operation speed according to the type of processor 150.

The CPU is a general central processing unit and is a processor capable of processing various operations and efficiently performing multitasking. However, the CPU has the advantage of being able to perform serial processing operations at high speed. The GPU is a graphics processing device, has a structure optimized for parallel processing, and is a processor capable of efficiently performing image processing. The NPU is an artificial neural network processing device and has a structure optimized for matrix computation of quantized data.

Referring to FIG. 7C, the processor 150 is an artificial neural network processor, which is an NPU. Since the NPU is optimized for the computation of the AI recognition model 155 and can be quantized, the computational speed can be 25 times faster than the CPU capable of artificial neural network computation, and the computational efficiency can be better by 50 times or more.

That is, when the quantized AI recognition model 155 is driven in the processor 150 in which the NPU is implemented, the performance of the embodiments of the present disclosure may be improved. However, the present disclosure is not limited thereto.

According to the above-described configuration, the mobile artificial neural network device 100 can recognize products at a high frame rate in low power and low memory bandwidth.

A mobile artificial neural network device according to embodiments of the present disclosure may include a camera configured to output a video of a product at a first frame rate, an AI recognition model configured to recognize product information by receiving the video of the product, an artificial neural network processor configured to drive an AI recognition model at a second frame rate, and a display module configured to display a video of a product at a first frame rate and to display product information at a second frame rate.

The first frame rate and the second frame rate may be the same. The first frame rate may be faster than the second frame rate.

A mobile artificial neural network device further includes a battery, and the camera or artificial neural network processor may be configured to lower the first frame rate when the remaining charge of the battery falls below the first threshold value.

The first frame rate may be configured to be selectively adjusted in consideration of power consumption of the mobile artificial neural network device.

The artificial neural network processor may be configured to include an operation structure capable of performing an artificial neural network operation of an AI recognition model.

The mobile artificial neural network device may display an augmented reality in a display module by superimposing product information on a video of the product.

The mobile artificial neural network device further includes a communication module, and the communication module may be configured to transmit information on the product to the server and to receive additional information on the product searched from the server.

The mobile artificial neural network device may transmit only product information among the product video and the product information to the server through the communication module.

The mobile artificial neural network device may transmit product information to the server and may receive additional product information from the server.

The AI recognition model recognizes consecutive images of a video of a product input from various angles, and when information of different products among product information is recognized, the information of different products may be combined.

The information accumulated by the AI recognition model may be at least one of product shape, color, trademark, name, manufacturer, and barcode.

The AI recognition model may recognize a video of a product and may output information of at least one product in the order of a high recognition rate.

The AI recognition model may be updated with the newly trained AI recognition model through the server.

The AI recognition model may further include a plurality of mutually different AI recognition models.

The AI recognition model may recognize the GS1 standard product identification code or barcode and may receive additional information of the product corresponding to the GS1 standard product identification code or barcode through the server.

The additional information on the product may include information on the lowest price corresponding to the information on the product.

The lightened AI recognition model may be applied with at least one lightening technique among pruning, quantization, model compression, knowledge distillation, and retraining, and AI-based lightening model optimization techniques.

The processor may be an artificial neural network processor, which is an NPU.

Features, structures, effects, and the like described in the embodiments above are included in one embodiment of the present disclosure, and are not necessarily limited to only one embodiment. Furthermore, the features, structures, effects, and the like illustrated in each embodiment may be combined or modified for other embodiments by a person having ordinary knowledge in the art to which the embodiments belong. Accordingly, contents related to such combinations and modifications should be construed as being included in the scope of the present disclosure.

In addition, although the above has been described with reference to the embodiment, this is only an example and does not limit the present disclosure and those ordinary skilled person in the art to which the present disclosure pertains will appreciate that various modifications and applications not illustrated above are possible without departing from the essential characteristics of the present embodiment. For example, each element specifically shown in the embodiment can be modified and implemented. Thus, differences related to these modifications and applications should be construed as being included in the scope of the present disclosure defined in the appended claims.

[National R&D project that supported this invention]
[Task identification number] 1711117015
[Task number] 2020-0-01297-001
[Ministry Name] Ministry of Science and Technology Information and Communication
[Name of project management (professional) institution] Information and Communication Planning and Evaluation Agency
[Research project name] Next-generation intelligent semiconductor technology development (design) (R&D)
[Research Title] Advanced Data Reuse Development of Deep Learning Processor Technology for Ultra-low Power Edge
[Contribution rate] 1/1
[Name of project execution organization] DEEPX CO., LTD.
[Research Period] 2020 Apr. 1~2020 Dec. 31

What is claimed is:

1. A mobile artificial neural network device including:
a camera configured to film a video of a product at a first frame rate;
an artificial intelligence (AI) recognition model configured to recognize unique product information by receiving the video of the product at the first frame rate and further configured to consume less power in the recognizing of the unique product information when operating below a threshold value than that consumed when operating above the threshold value;
an artificial neural network processor configured to drive the AI recognition model at a second frame rate that is slower than the first frame rate according to the threshold value, by
controlling the camera to output the video of the product at the first frame rate irrespective of the threshold value and
setting an operating speed of the artificial neural network processor to be lower than an operating speed of the artificial neural network processor when operating above the threshold value;
a display configured to display the video of the product filmed at the first frame rate in real-time and simultaneously display the unique product information recognized at the second frame rate in real-time; and
a transceiver configured to transmit only the unique product information recognized by the AI recognition model to a server without transmitting the video of the product to the server,
wherein the AI recognition model is further configured to recognize consecutive images of the video of the product input from various angles, and
wherein, when information of different products among unique product information of the consecutive images is recognized, the information of different products is combined.

2. The mobile artificial neural network device according to claim 1, further comprising a battery, wherein the camera or the artificial neural network processor may be configured to lower the first frame rate when a remaining charge of the battery falls below the threshold value.

3. The mobile artificial neural network device according to claim 1, wherein the first frame rate is configured to be selectively adjusted in consideration of power consumption of the mobile artificial neural network device.

4. The mobile artificial neural network device according to claim 1, wherein the artificial neural network processor has an operation structure optimized for performing an artificial neural network operation of the AI recognition model.

5. The mobile artificial neural network device according to claim 1, wherein the unique product information of the consecutive images is superimposed on the video of the product to display augmented reality in the display.

6. The mobile artificial neural network device according to claim 1, wherein the transceiver is further configured to
transmit the unique product information recognized by the AI recognition model to the server as a query in response to a user touching a search window for the product displayed on the display, and
receive, in response to the query, additional information on the product searched from the server that is changed in real-time.

7. The mobile artificial neural network device according to claim 6, wherein the mobile artificial neural network device is configured to
search for an additional AI recognition model based on the transmitted unique product information of the query and
store the searched AI recognition model such that the AI recognition model includes a plurality of mutually different AI recognition models.

8. The mobile artificial neural network device according to claim 6, wherein the AI recognition model is further configured to recognize a GS1 standard product identification code or a barcode and to receive the additional information on the product corresponding to the GS1 standard product identification code or the barcode through the server.

9. The mobile artificial neural network device according to claim 6, wherein the additional information on the product includes information on a lowest price corresponding to the transmitted unique product information of the query.

10. The mobile artificial neural network device according to claim 1,
wherein the AI recognition model is further configured to accumulate information based on the recognized consecutive images, and
wherein the information accumulated by the AI recognition model may be at least one of product shape, color, trademark, name, manufacturer, and barcode.

11. The mobile artificial neural network device according to claim 1,
wherein the AI recognition model includes a plurality of mutually different AI recognition models, and
wherein the AI recognition model is further configured to recognize the video of the product and to output information of at least one product using a specific AI recognition model having a high recognition rate among the plurality of mutually different AI recognition models.

12. The mobile artificial neural network device according to claim 1, wherein the AI recognition model is a lightened AI recognition model.

13. The mobile artificial neural network device according to claim 12, wherein the lightened AI recognition model is applied with at least one lightening technique among pruning, quantization, model compression, knowledge distillation, and retraining.

14. The mobile artificial neural network device according to claim 1, wherein the artificial neural network processor is a neural processing unit (NPU).

15. A mobile artificial neural network device including:
a camera configured to film a video of a product at a first frame rate;
a lightened artificial intelligence (AI) recognition model with quantized weight values, configured to recognize unique product information by receiving the video of the product at the first frame rate and further configured to consume less power in the recognizing of the unique product information when operating below a threshold value than that consumed when operating above the threshold value;
an artificial neural network processor configured to drive the lightened AI recognition model at a second frame rate that is slower than the first frame rate according to the threshold value, by
controlling the camera to output the video of the product at the first frame rate irrespective of the threshold value and
setting an operating speed of the artificial neural network processor to be lower than an operating speed of the artificial neural network processor when operating above the threshold value;
a display configured to display the video of the product filmed at the first frame rate in real-time and simultaneously display the unique product information recognized at the second frame rate in real-time; and
a transceiver configured to transmit only the unique product information recognized by the lightened AI recognition model to a server without transmitting the video of the product to the server,
wherein the lightened AI recognition model is further configured to recognize consecutive images of the video of the product input from various angles, and
wherein, when information of different products among unique product information of the consecutive images is recognized, the information of different products is combined.

* * * * *